United States Patent [19]
Cucchi

[11] Patent Number: 5,649,462
[45] Date of Patent: Jul. 22, 1997

[54] ANGULARLY SWINGABLE SELF-CENTERING DEVICE FOR SUPPORTING ROTATABLE BAR STOCKS

[75] Inventor: Giovanni Cucchi, Bussero, Italy

[73] Assignee: Cucchi Giovanni & C. S.R.L., Bussero, Italy

[21] Appl. No.: 455,995

[22] Filed: May 31, 1995

[30] Foreign Application Priority Data

Jun. 7, 1994 [IT] Italy ................... MI94A1186
Dec. 23, 1994 [IT] Italy ................... MI94A2641

[51] Int. Cl.⁶ .................................................. B23B 13/02
[52] U.S. Cl. .................................................. 82/164
[58] Field of Search ..................... 82/162–163, 164, 82/170

[56] References Cited

U.S. PATENT DOCUMENTS 4,058,036  11/1977  Austin ........................... 82/162

FOREIGN PATENT DOCUMENTS 0364656  4/1990  European Pat. Off. .
0390919  10/1990  European Pat. Off. .
627920  10/1978  U.S.S.R. ................... 82/162

Primary Examiner—M. Rachuba
Assistant Examiner—Kenneth J. Hansen
Attorney, Agent, or Firm—Young & Thompson

[57] ABSTRACT

An angularly swingable and self-centering bar support device for supporting and guiding bar and tube stock material along a feeding path coaxially arranged to a turning spindle of a machine tool. The device comprises a support frame for at least one idly rotating bar-support which is swingably pivoted to the support frame; and a control means to rotate and selectively lock the bar support in a plurality of positions angularly oriented in respect to the feeding path for the bar.

6 Claims, 5 Drawing Sheets

ANGULARLY SWINGABLE SELF-CENTERING DEVICE FOR SUPPORTING ROTATABLE BAR STOCKS

BACKGROUND OF THE INVENTION

The present invention relates to a self-centering device for supporting and guiding bar stocks or tubular elements, hereinafter referred to as "bar support device", while the same bar stocks or tubular elements are being fed to a turning spindle of a machine tool. In particular the invention is directed to a self-centering device able to adapt to bars or tubular elements having different cross-sectional shape and size, to constantly exert a self-centering dynamic action which maintains the bar or the tubular element perfectly aligned with the feeding path and the working axis of the spindle of the machine tool, irrespective of the diameter or cross-sectional of the same bar or tube. For the purposes of the present description, the term "bar" refers to any elongated stock element having a solid circular, square, polygonal or tubular cross-sectional configuration or outline.

In the field of machine tools, more particularly for single-spindle and multi-spindle lathes, various automatic bar feeding systems have been developed, having bar support means capable of adapting automatically, or by replacing support jaws, to guide and support bars of different diameters or cross-sectional. Examples of these devices can be found in previous patents: EP-A-213,659, EP-A-370,240, EP-A-384,344, EP-A-485,902 and EP-A-570,830.

The previously known bar feeding and supporting devices usually operate at the low working speeds of the machine tools. They nevertheless suffer limits and disadvantages in that they provide a minimal static centering action only, being not very suitable for the increasingly high working speeds of modern machine tools, which in some cases can reach or even exceed ten thousand revs per minute. In fact, at high rotation speeds, small eccentricities or slight bendings of a bar can entail strong stress and wobbling which cause noise, wear of the guides and possible machining inaccuracies.

From the patent U.S. Pat. No. 4,058,036 a variable opening and adjustable bar support device is known, comprising a tubular sleeve element and a plurality of spherical rings pivotally supported and axially spaced inside the sleeve element, between which sliding thrust rings are provided; the thrust rings have projections acting on the spherical rings to swing them in unison in a plurality of angularly oriented positions. By manually acting on a regulation ring nut, or by providing a centrifugal actuator, it is possible to vary the angular position of the spherical rings and adjust their passage opening according to the diameter of the bars to be supported and guided.

Such a bar support device, although allowing to maintain the bars substantially aligned with the working axis of the machine tool, irrespective of the diameter of the bar or tubular element, in practice suffers a number of problems caused by its structure and by the fixed arrangement of the spherical rings in relation to the rotating bar.

In fact, the variable opening bar support device according to U.S. Pat. No. 4,058,036, which forms the state of the art closest to the present invention, involves an extremely complex structure, wholly unsuitable for operating at the high working speeds of modern machine tools, both due to the considerable wear in the sliding contact between the rotating bar and the fixed guide rings, as well as to the difficulty in adjusting correctly the angular position of the various rings, causing inadequate conditions for the centering of bars. Again, the increasingly high working speeds of the modern machine tools, particularly for bars of very small diameter, will tend to increase the centrifugal forces and frictional wear between the bar and the support ring, increasing noise and wobbling problems; this is presumably due to the absence of any dampening action by the same annular element.

From tests and experiments conducted by using a bar support device having a fixed annular member for supporting rapidly rotating bars, it was concluded that randomly oriented frictional forces and the same reaction of the annular element which tends to oppose the movement of the bar, during rotation, will not improve the noise and wobble dampening action of the device.

From further tests it has been discovered that a substantial noise and wobble reduction, as well as an appropriate self-centering action, may be favourably obtained by accompanying instead of opposing the rotation of the bar by the same supporting and guiding device, as well as by providing variable contact points between the bar and the annular element according to angular disposition of the same bar supporting device.

The object of the present invention is therefore to provide a bar support device for guiding bars to the spindle of a machine tool, which make use of an angularly adjustable annular element, which exploits the rapid rotation of the bar to exert an effective and constant dynamic self-centering action on the same bar, substantially reducing problems of wear and noise caused by wobbling of the bar while it rotates at the high working speeds of the machine tool.

A further object of the present invention is to provide a self-centering device for supporting rotating bars, as referred above, which is of an extremely simple construction, and can be variously applied alone or in combination with other similar devices, to keep the bar duly centered near the spindle of the machine tool, or for guiding and supporting bars in bar-feeders for single-spindle and multi-spindle machines.

A further object of the invention is to provide a bar support self-centering device, as stated above, which is of simple and reliable construction allowing at the same time a rapid and easy set-up.

SUMMARY OF THE INVENTION

According to the present invention, the innovative principle consists in having a swingable and freely rotatable bar support element which may differently rotate either in respect to a support frame or to the same bar.

Although the use of a rotating support element has already been proposed in previously known devices, nevertheless their disposition, which is constantly fixed and aligned with the working axis of the machine tool, provides a small static centering action only for bars having a large diameter equal to or slightly smaller than the internal diameter of the same support element, leaving bars with smaller diameters insufficiently supported only from below, and hence subject to vibrations and wobbling during rotation, as mentioned previously.

It has now unexpectedly been found that supporting and guiding a rotating bar by means of a swingable idly rotatable annular element, angularly orientable in relation to the axis of the same bar, will provide opposing dynamic forces in the same rotational direction of the bar which tend to maintain the bar automatically centered while it rotates. The angularly swingable arrangement and consequently the larger internal diameter of the rotatable guide element, in relation to the bar, in addition to the generation of a dynamic self-centering action also allows the annular element to rotate at a speed lower than the bar, as a result of the relative rotation between the bar and the same annular element due to their different disposition and diameters at the contact points. These results in a noise and wear reduction by a combination which cannot be achieved, nor obviously suggested by the teachings of the previous documents.

BRIEF DESCRIPTION OF THE DRAWINGS

The invention will be now described in greater detail hereinbelow, with reference to the accompanying drawings, in which.

DETAILED DESCRIPTION OF THE INVENTION

With reference to FIGS. 1 to 5, we shall describe a first embodiment, suitable for illustrating the general principles of the bar-support and self-centering device according to the invention.

Figure 1:
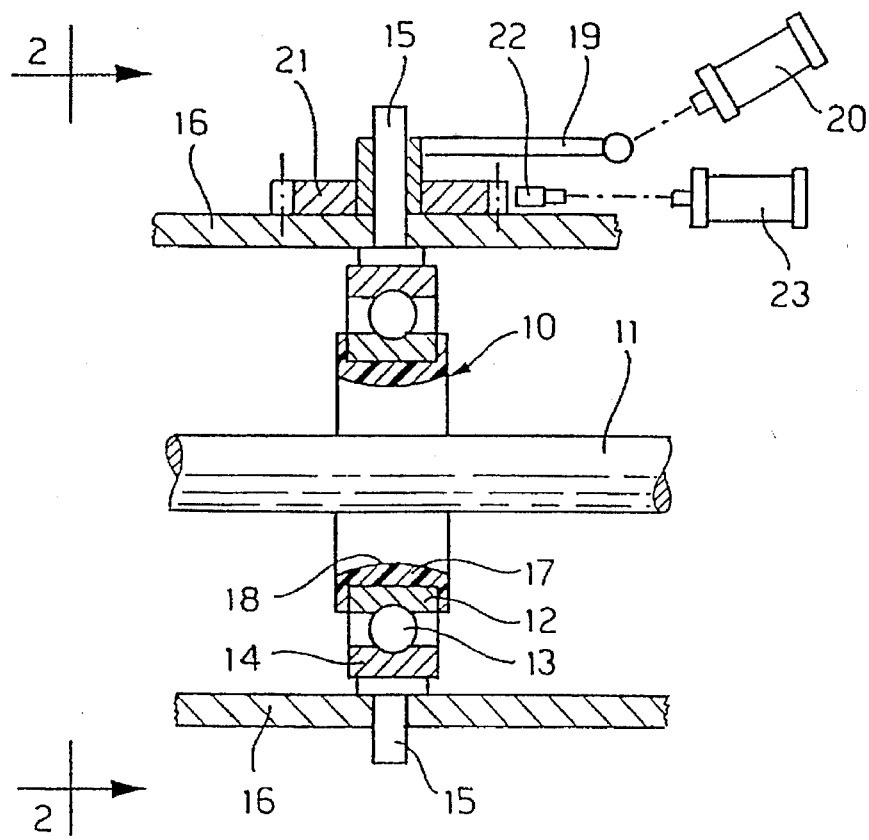
FIG. 1 is a cross-sectional view of an angularly swingable self-centering bar-support device, according to general principle of the invention.
Figure 2:
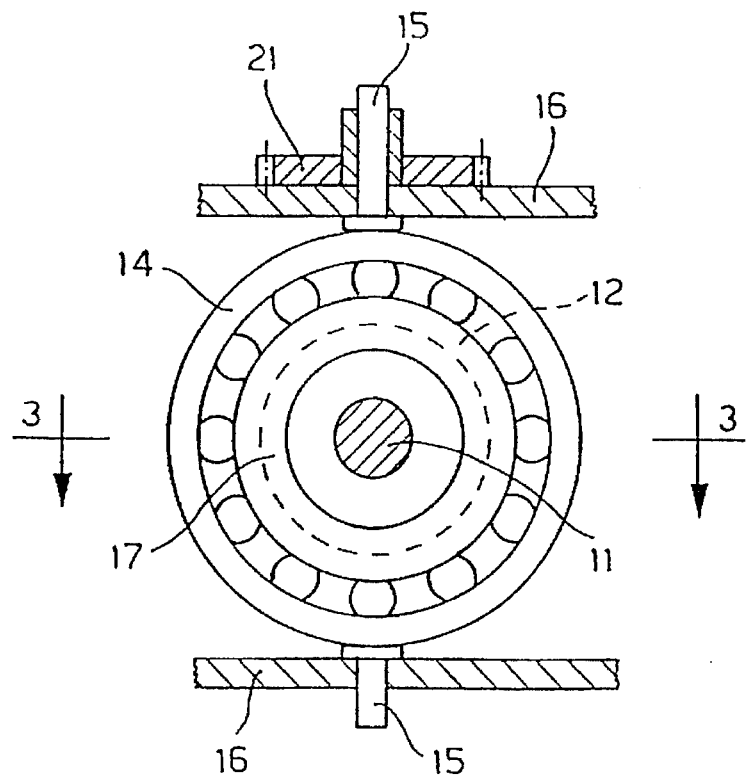
FIG. 2 is a front view along line 2—2 of FIG. 1.
Figure 3:
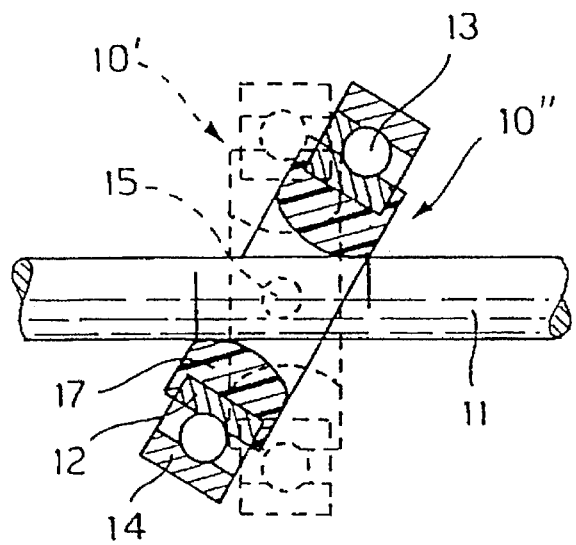
FIG. 3 is a cross-sectional view along line 3—3 of FIG. 2.

As shown in FIGS. 1 to 3, the device comprises at least one self-centering bar support means 10 for rotatably supporting and guiding a bar stock or tubular element 11 to be fed to a turnable spindle of a machine tool, along the longitudinal axis of a bar feeding path, corresponding to a fixed center line of the bar support means 10.

More precisely the device comprises a first annular element 12 which is supported to idly or freely rotate around its fixed central axis, for example by ball members 13, or another equivalent rolling means provided between said first annular element 12 and a casing or support member 14 which is angularly swingable on two opposed pivot pins 15 supported by a frame 16. The assembly of the rotating annular element 12 and of the swingable casing 14 is therefore pivoted, by means of the pins 15, to angularly move about an axis perpendicular to the central line of the device or the longitudinal sliding axis of the bar 11, to take up any angular position between the maximum opening position for the bars, shown in FIGS. 1 and 2, and denoted by 10' in FIG. 3, wherein the annular element 12 and casing 14 are arranged in a plane perpendicular to the bar, and one or more minimum opening positions denoted by reference 10" in the same Figure, wherein the annular element 12 and casing 14 are arranged in a plane forming an angle smaller than 90° with the longitudinal axis of the bar.

Preferably, the idly rotating annular element 12 is comprised of a rigid ring member and a lining 17 of elastomeric material forming an elastically yieldible annular pad designed to come into contact with the bar 11 to be supported. Preferably, in the example shown, the pad 17 comprises an inner surface 18 having a slightly arcuate configuration in the longitudinal direction of the central line, in order to reduce to a minimum the contact points with the bar 11, and to provide substantially tangential arrangement of the inner surface 18 of the pad 17, in respect to bar 11, irrespective of the angular position assumed by the same device.

The arcuate configuration of the inner surface 18 of said pad 17 is also suitable for greater spacing of the opposed contact points with the bar, to better sustain bars of smallest diameter or cross-sectional, preventing their bending or deformation during rotation, as well as to substantially reduce the rotational speed of the annular element 12.

One of the two pivot pins 15 is connected, by means of a toggle lever 19 to an actuator 20, for example a pneumatic cylinder, by means of which the assembly of the support means 10 can be made to swing or rotate and positioned in any required angular disposition, between the maximum opening 10' and the minimum opening 10" referred above.

Figure 5:
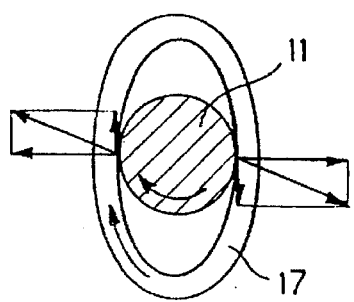
FIG. 5 is a schematic representation of the innovative principle of the invention.
Figure 6:
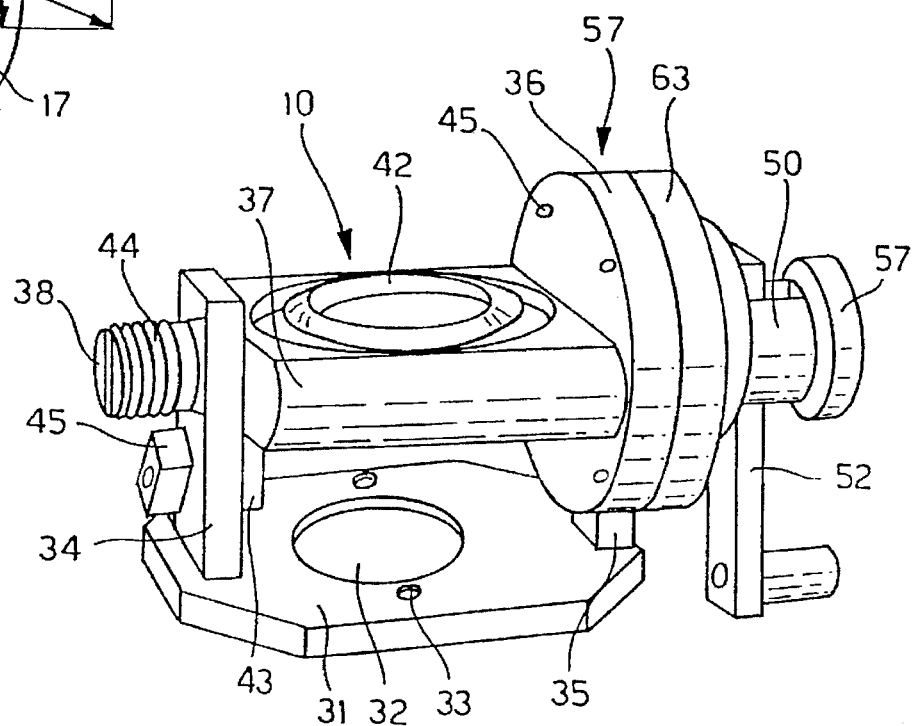
FIG. 6 is a perspective view of a second embodiment of the invention.

In general, the inner diameter of the idly rotating annular element, that is to say of the pad 17 of elastically yieldible material, must be greater than the diameters of the bars 11 to be guided, to allow the same annular element 12 to assume an angular disposition in relation to the same bar 11 and to reduce its rotational speed. In this way the contact between bar 11 and pad 17 of the annular element 12 always occurs at diametrically opposite points, generating opposing dynamic reaction forces having tangential components constantly oriented in the same rotational direction as the bar, as shown in FIG. 5, which tend to maintain the bar 11 constantly centered in respect to the fixed centerline of the device. Moreover, problems of wear of the rotating members of the bar support device are greatly reduced in relation to the lower rotation speed of the annular element 12, in that the contacts between the annular element 12 and the bar take place on different diameters.

In the example shown, the device also comprises disengageable locking means which can be actuated to maintain the casing or support member 14 and the annular element 12 of the support device, in any required angular disposition. In the example of FIG. 1 the locking means has been schematically indicated by a cogged wheel 21 connected to one of the pins 15; the cogged wheel 21 engages with a pawl member 22 or another locking means controlled by an actuator 23, or in another way.

As mentioned previously, the innovative aspect of the invention lies mainly in the use of an annular bar-support element freely rotatable with the bar, which can be angularly positioned on a pivoting axis perpendicular to the fixed central line of the same annular element, that is to say in relation to the sliding axis of the bars. Rolling contact of the bar is obtained at diametrically opposite points of the annular bar-support element and results in a relative rolling movement which, due to the different angular rotational speeds, generates opposing dynamic forces which contribute to maintaining the axis of the bar constantly centered. The bar 11 is therefore constantly aligned with the working axis of the spindle of the machine tool.

Since the rapid rotation of the bar 11 also drives the annular element 12 to rotate without causing any dragging, and since the elastically yielding surface of the pad 17 adheres to the bar 11 with a slight pressure, a highly reliable centering and guide device is thus obtained, capable of absorbing any local deformations of the bar, that is to say of adapting also to bars or pipes with square or polygonal section, without any substantial disadvantage.

Figure 4:
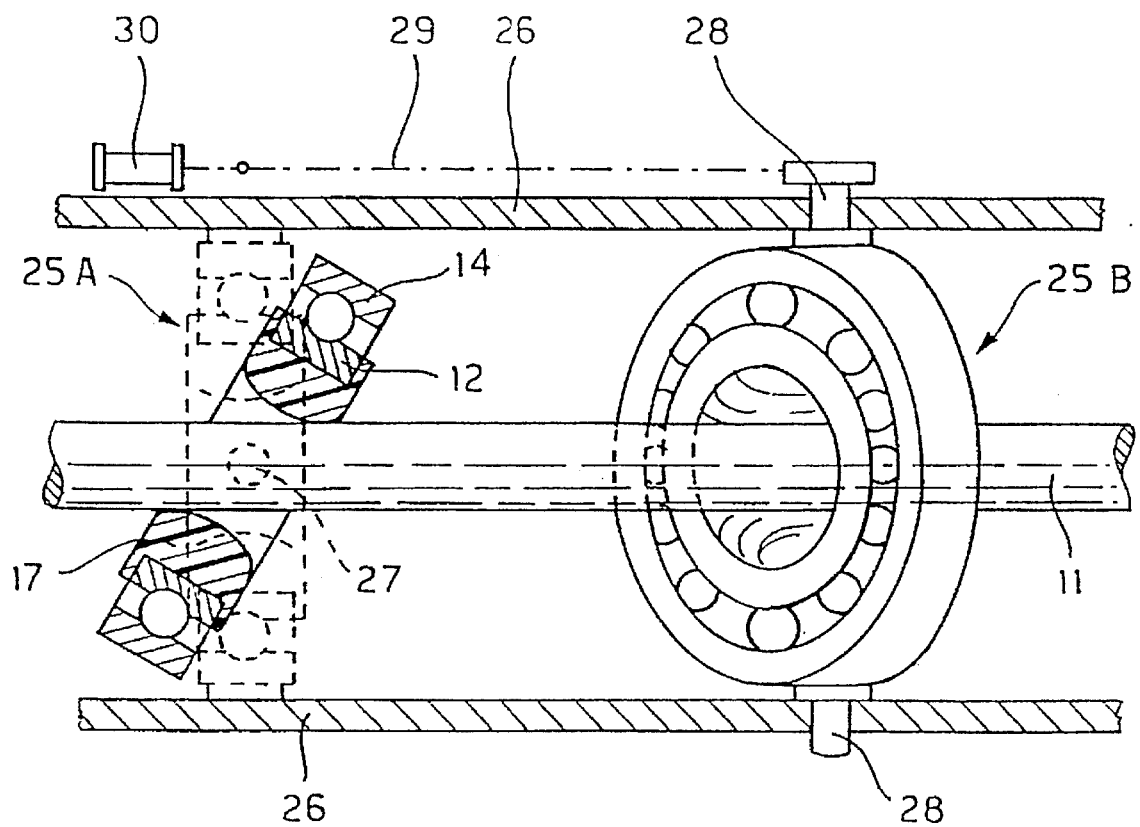
FIG. 4 shows the use of two spaced apart bar support devices which can swing along respective pivotal axes perpendicular one to the other.

FIG. 4 of the drawings shows a particular embodiment for a guide device which comprises two self-centering bar-support devices 25A and 25B according to the invention, placed and spaced apart in an elongated tubular shell 26. Each device 25A, 25B is swingably supported and angularly positionable by means of respective pivot pins 27 and 28, in which the pins 27 of the device 25A are aligned along an axis perpendicular to that defined by the pins 28 of the other device 25B. In this way, on the basis of what has been mentioned previously, a double dynamic self-centering action in axially spaced apart positions is exerted on the bar 11, with forces oriented one in relation to the other at 90°, which hold the bar 11 perfectly centered both horizontally and vertically.

If required, this arrangement of the support devices 25A and 25B could be improved by using a set of support devices having pivot pins alternately positioned at 90°, that is to say variously positioned one in relation to the other. This is particularly advantageous in the construction of guides for supporting bars of considerable length and of relatively small diameter, in that it prevents in practice the onset of strong centrifugal actions on a rapidly rotating bar, which otherwise would tend to deform or damage it, thus being effectively opposed along the whole circumference.

The orientation of the various support devices 25A and 25B around the respective pivoting axes, could be obtained by separate drive means or by a single drive device comprising an articulated connection 29 between pins, and a pneumatic actuator 30, as well as by providing suitable angular locking devices as described previously.

From what has been said and shown with reference to the previous figures it is clear that a swingable and positionable bar-support device according to the present invention, capable of contacting the bar at diametrically opposite points lying on two opposite sides of the device itself, not only allows bars or tubular elements of different diameters to be rotatably supported and maintained in a perfectly centered position, but allows also the bar or tubular element to be guided and made to slide with minimum friction and without causing difficulties.

The device of FIG. 1 operates substantially as follows: initially the support device with the annular element 12 is positioned in the plane perpendicular to the sliding axis of the bar 11 (FIG. 1) to exploit the maximum opening for the insertion of the same bar. Later the angular rotation is performed until it is brought into contact on the two sides of the pad 17 with the bar which has in the meantime been inserted, exerting on the latter a slight pressure which ensures the driving in rotation of the annular element 12. In this way the bar 11 is rotatably supported and maintained perfectly centered or aligned with the working axis of a machine tool.

When the bar 11 has to be moved forward, the support device is once again returned into the plane perpendicular to the sliding axis of the bar, and the bar is made to move forward for the required length and later the support device is once again angularly rotated in the manner described previously.

It is clear that in the case wherein the guide device comprises two or more devices according to the invention, their pivoting axis must be appropriately interconnected one to the other.

According to the invention an effective dynamic centering action is obtained, which cannot be achieved with any of the guide or support devices of the known type. Therefore the rotating support and centering device, which can be positioned angularly, according to the invention can be effectively used in providing automatic bar feeders for machine tools, both of the single-spindle and multi-spindle type.

A first preferred embodiment of a self-centering device according to the invention, will be now described hereinunder with reference to FIGS. 6 to 9.

As shown, the self-centering device, denoted overall by 10, comprises a base plate 31 provided with a central hole 32 for the passage of bars to be fed to a machine tool, as well as lateral holes 33 for fastening the device to a bar-guide sleeve of a bar feeder. Two uprights 34 and 35 protrude from the base plate 31, one of which ends with a disk like portion 36 for the purposes specified hereinbelow.

The upright 34 and the disk 36 support a swingable casing 37, angularly positionable along a longitudinal axis defined by a pair of pivot pins 38 and 39 which extend on the two opposite sides of the upright 34 and of the disk 36.

The swingable casing 37 has a circular seating 40 wherein a rolling bearing 41 is housed and whose inner ring 12 defines the freely rotating annular member of the present invention and is provided with an annular pad 42 of Teflon or another suitable anti-frictional material for supporting and guiding bars to be fed to a machine tool. The casing 37, the bearing 41 and the annular pad 42 for supporting bars can be angularly and selectively positioned as appropriate in relation to the base plate 31 and according to the diameter of the bar to be supported and guided. The rotation of the casing 37 in any angular position, is between a first totally open position, shown in the various figures, wherein the swingable casing 37 is arranged parallel to the base plate 31, against a lateral stop 43, wherein the annular element 12 and pad 42 are axially aligned with the hole 32 of the plate 31, and an end angular position forming an angle smaller than 90° in relation to the plate 31, which depends on the constructional features and on the minimum diameter foreseen for the bars to be guided.

A helical return spring 44 is arranged around the pin 38, having one of its ends locked to the upright 34 by the clamp 45 while the other end is inserted in a transverse slot 46 of the pin 38.

The self-centering device for guiding bars also comprises disengageable drive means, denoted overall by 47, which can be actuated to rotate or lock the casing 37 supporting the annular element 12 and pad 42 in any angular position as required.

More specifically, the drive means comprise an adjustable coupling capable of rotating and sliding axially in relation to the pivot pin 39.

The coupling is in the form of a sleeve member 48 having a pair of diametrically opposite projections or lugs 49, as well as a cylindrical shank 50 which extends to the rear and is provided with a longitudinal through slot 51 wherein one end of a control lever 52 engages. The lever 52 has a through hole 53 formed with a slot 54 wherein a key 55 at the small diameter end of the pivot pin 39 engages. The angular position of the key 55 and slot 54 of the control lever 52 are related to an end position of the casing 37 which houses the annular bar-guide element 12 and pad 42 such that the angular position of the lugs 49 of the sleeve 48 is correlated to that of the same casing 37 in the position indicated.

The lever 52 is attached to the pin 39 by means of a bolt 56 which screws into a threaded hole of the same pin. A cap 57, which can be screwed onto a threaded part 58 at the rear end of the hollow shank 50 of the coupling sleeve 48, allows an axial thrust to be exerted on the latter.

The device comprises a second coupling element in the form of a cup shaped element 59 which is arranged coaxially around the first coupling element or sleeve 58.

The second coupling element 59 has an annular shoulder 60 wherein two diametrally opposed seats 61 are formed to house the lugs 49 of the first coupling element 48.

The second coupling element 59, on the side facing the disk 36 of the base plate 31, has a flanged edge 62 designed to rest against the opposite face of the disk 36. In this way the second coupling element 59 can be rotated and locked through friction against the disk 36, by means of a ring 63 provided with holes 64 for the passage of corresponding locking screws threaded into holes 65 of the disk 36. In this way the second coupling element 59 can be locked through friction against the disk 36, in any angular position of the seats 61 to which a respective angular position of the casing 37 for housing the annular elements 12, 42 for guiding, supporting and centering a bar to be fed to the machine tool, will correspond.

As mentioned previously, the first coupling element 48 has the two projecting lugs 49 which are inserted into the seats 61 of the shoulder 60 inside the second coupling element 59. Said lugs 49 and said seats 61 jointly define engageable and disengageable means for reciprocal interlocking and angular reference by means of a simple axial sliding movement of the first coupling element 48, against the action of a thrust spring 66. The spring 66 is arranged around the larger diameter part of the pin 39 and partially penetrates the sleeve element 48 resting against an annular shoulder 67.

Briefly, the device operates as follows: initially the device is in the conditions shown in the various figures, with the swingable casing 37 parallely arranged to the base plate 31, against the stop 43, being pushed into this position by the return spring 44. In these conditions, by loosening the screws of the locking ring 63, maintaining coupling elements 48 and 59 engaged one with the other, it is possible to act on the casing 37 by positioning it in the required angular position, according to the diameter of the bars which have to be supported and fed. This angular rotation is allowed by the fact that the second coupling element 59, no longer clamped by the ring 63, can now rotate. When the positionable casing 37 and consequently the coupling elements 48 and 59 have assumed the required position, the coupling element 59 is locked once again by means of the ring 63. During this rotation the return spring 44 has been appropriately preloaded.

In these conditions, by acting with an axial thrust on the cap 57 screwed to the shank 50 of the first coupling element 48, the latter can be pushed forwards, withdrawing the lugs 49 from the seats 61, in this way disengaging them from the second coupling element 59. Since the spring 44 has been preloaded, the casing 37 with the annular elements 12 and 42 for guiding and supporting the bars are automatically made to rotate in an opposite direction to the previous one and returned to the initial position against the stop 43.

At this point the device is correctly set up to operate. Therefore, by acting on the control lever 52 the first coupling element 48 can be made to rotate and consequently the casing 37, in that the lugs 49 slide on the shoulder 60 until they are aligned with the seats 61. In this condition, the spring 66, which had previously been preloaded, will act on the first coupling element 48 to push it backwards, engaging it with the second coupling element 59 which, according to its angular position, will automatically make the coupling element 48 assume the same position and consequently the casing 37 and the annular elements 12 and 42 for guiding the bars. Since the annular elements 12, 42 generally have an internal diameter greater than the diameter of the bars to be guided, the angular position which the same will assume in relation to the bar, will allow the latter to be supported and guided both when axially fed and during rotation, maintaining it always perfectly centered.

A second embodiment of the self-centering bar-support device will be described with reference to FIG. 10. In this figure, the same numerical references have been used for parts similar to those of FIGS. 6 to 9.

As shown in FIG. 10, the device again comprises a casing 37 provided with pivot pins 38 and 39. The casing 37 houses a rolling bearing 41 as in the previous case, the inner ring 12 of which defines the freely rotating element of the self-centering device according to the invention. The solution of FIG. 10 differs from the solution of FIGS. 6 to 9 in that the previous embodiment comprises a single annular pad 42 having an outer peripheral groove by which the pad 42 is snap-seated on the ring or rotating annular support element 12, and in that the inner surface of the pad 42 comprises a cylindrical intermediate surface portion, and an outwardly flaring or conical surface portion at both ends to better adapt to bars of different diameters.

Figure 10:
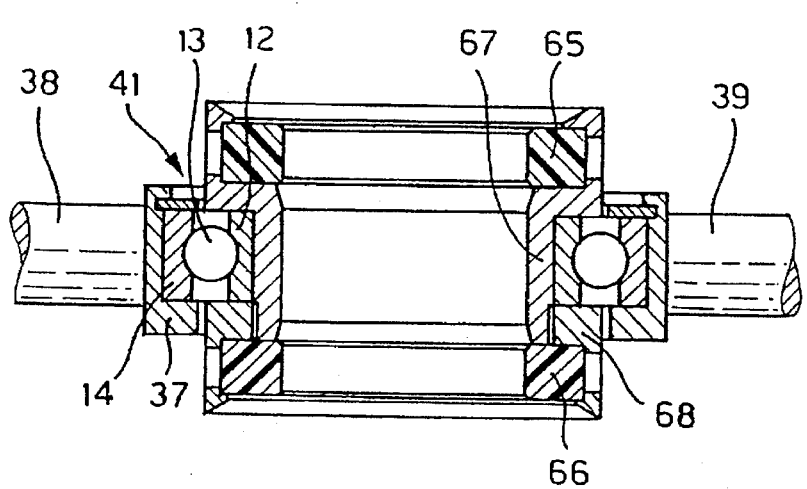
FIG. 10 is a sectional view of a further embodiment.
Figure 7:
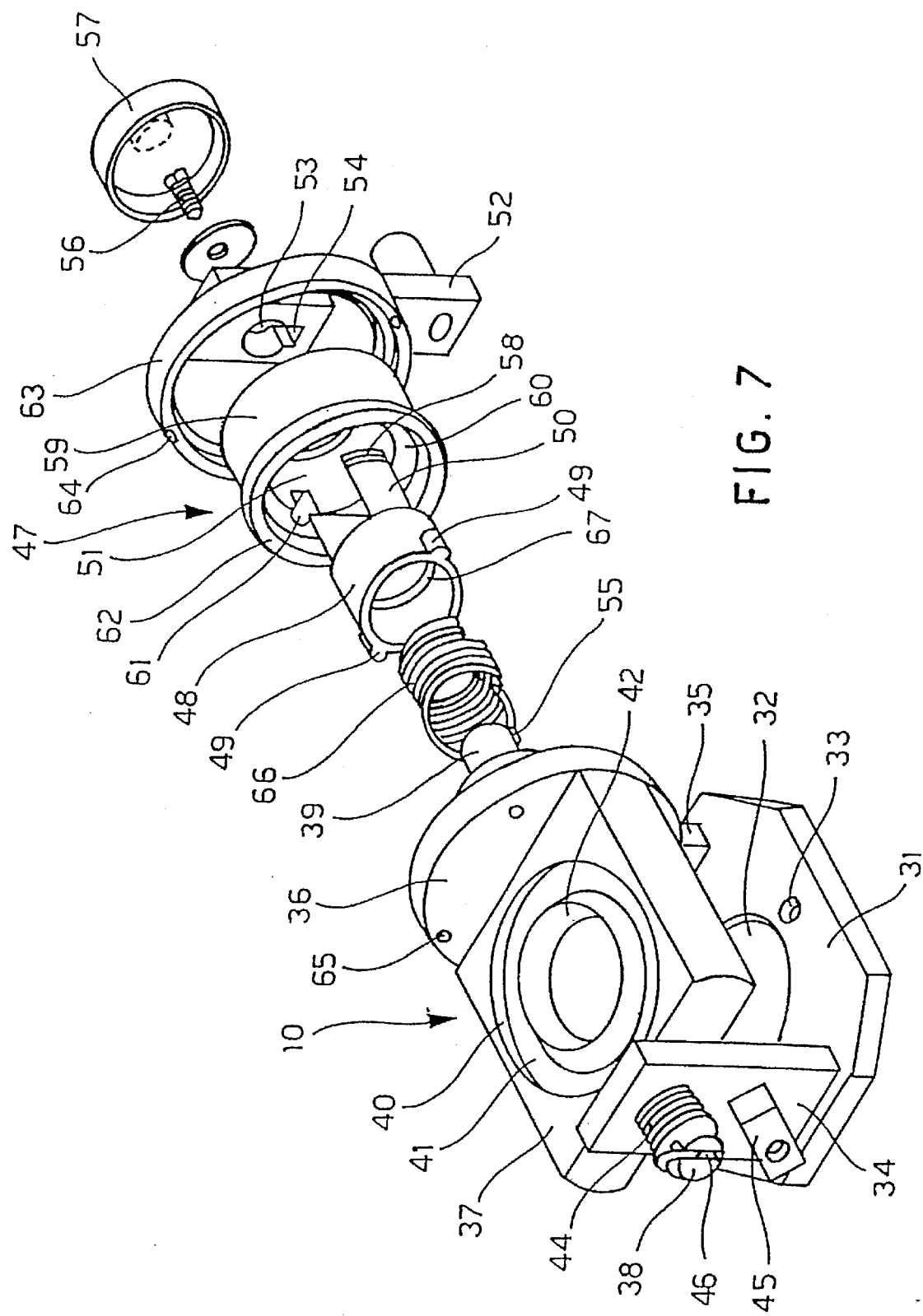
FIG. 7 is an exploded perspective view of the device of FIG. 6.
Figure 8:
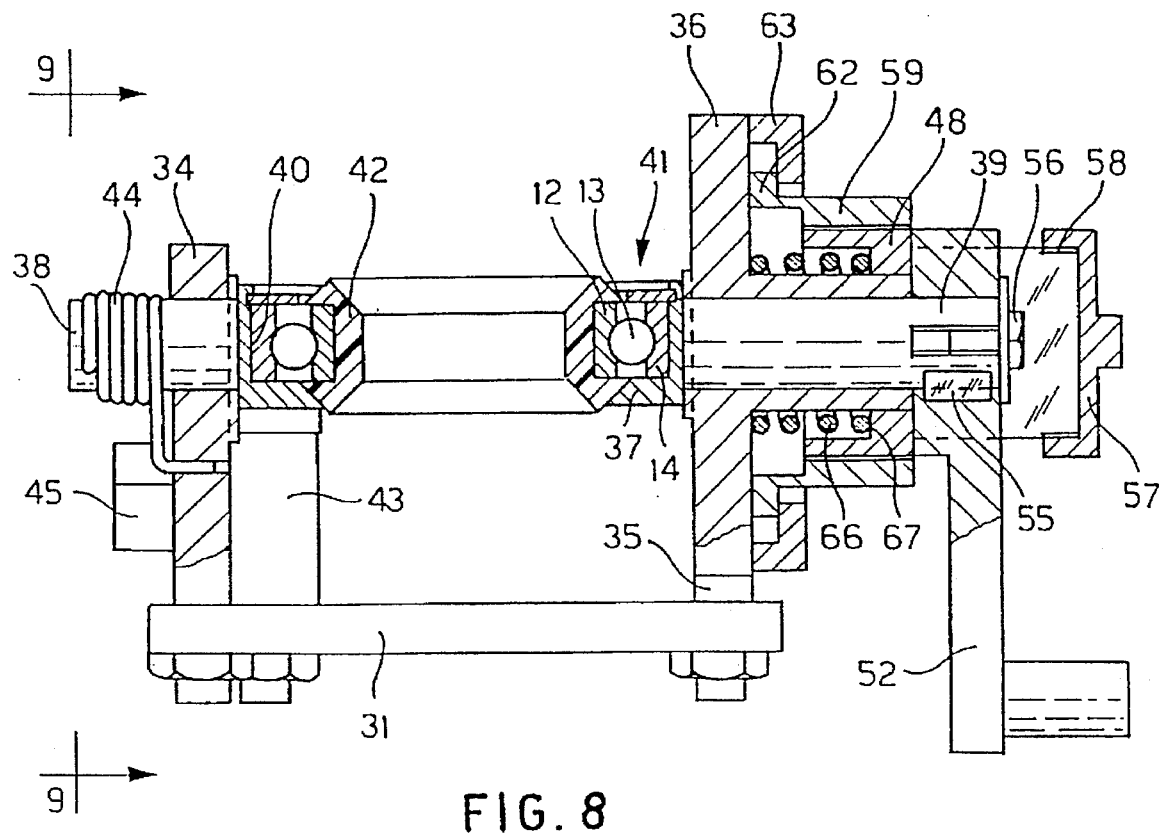
FIG. 8 is a longitudinal sectional view of the device of FIG. 6.
Figure 9:
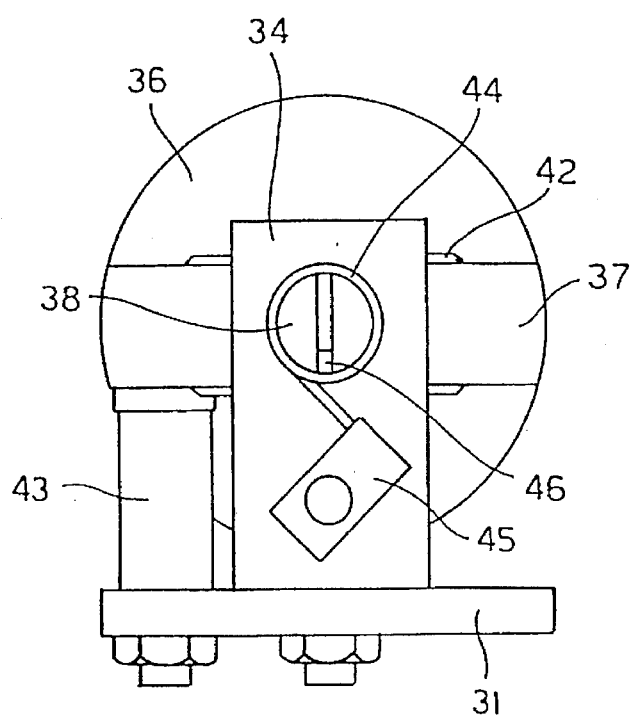
FIG. 9 is a view along line 9—9 of FIG. 8.

Conversely, in the case of FIG. 10, two separate pad members 65, 66 are forcibly seated in corresponding annular slots of a bushing clamped to the rotating ring 12; more precisely the bushing comprises a first and second bushing elements 67, 68 screwable relative to each other and against the inner ring 12 of the self-centering device, to allow a rapid substitution of a bushing 67, 68 and pad members 65, 66 of one diameter, with a similar bushing or with a bushing having pads 65, 66 of a different inner diameter.

What is claimed is:

1. A self-centering device for rotatably supporting an elongated work-piece having a rotational axis coaxially arranged to a spindle of a machine tool, the device comprising:

a frame and a swingable case pivotally supported by the frame to angularly orientate around a pivotal axis orthogonally extending to the rotational axis of the elongated work-piece, the case having a hole therethrough;

at least one annular member of elastomeric material, coaxially arranged to said hole to freely rotate in the case;

first and second coupling members coaxial with the pivotal axis of the case, the first coupling member being rotatably connected to a control lever and movable relative to the second coupling member of the device, the second coupling member being angularly adjustable in respect to the pivotal axis, and disengageably connected to said frame;

lug and seat means on the coupling members, to connect the first coupling member to the second coupling member in an angularly oriented condition of the first and second coupling members; and biasing means axially urging the first coupling member toward the second coupling member to engage said lug and seat means in said angularly oriented condition of the coupling members of the self-centering device.

2. A self-centering device as claimed in claim 1 further comprising anti-friction rolling means disposed between said case and said annular member.

3. A self-centering device as claimed in claim 2, wherein said case and said annular member are disengageable from each other.

4. A self-centering device as claimed in claim 1, wherein said annular member has a radially inner surface of relatively small diameter at a central portion thereof and relatively large diameters at end portions thereof.

5. A self-centering device according to claim 1, said disengageable connection of said second coupling member to said frame comprising means for releasably frictionally clamping said second coupling member to said frame.

6. A self-centering device according to claim 1, said at least one annular member comprising first and second annular members seated at the ends of a bushing removably fastened to an annular member that rotates freely relative to said frame.

* * * * *